(12) United States Patent
Cook

(10) Patent No.: US 6,360,515 B1
(45) Date of Patent: Mar. 26, 2002

(54) CROP CONDITIONING SYSTEM

(76) Inventor: Ivan J. Cook, Circle C Equipment, Rte. 1, Box 1963, Hermiston, OR (US) 97838

(*) Notice: Subject to any disclaimer, the term of this patent is extended or adjusted under 35 U.S.C. 154(b) by 0 days.

(21) Appl. No.: 09/534,245

(22) Filed: Mar. 23, 2000

Related U.S. Application Data

(63) Continuation-in-part of application No. 09/015,417, filed on Jan. 29, 1998, now Pat. No. 6,050,070.

(51) Int. Cl.[7] ............................................. A01D 27/00
(52) U.S. Cl. ..................................... 56/14.1; 56/16.4 C
(58) Field of Search ................... 56/1, 6, 14.1, 16.4 B, 56/16.4 C, 192, 16.5, 1 DIG; 100/169, 170

(56) References Cited

U.S. PATENT DOCUMENTS

| | | |
|---|---|---|
| 2,698,170 A | 12/1954 | Foley |
| 2,921,426 A | 1/1960 | Heth |
| 2,947,130 A | 8/1960 | Everett |
| 2,974,462 A | 3/1961 | Heth |
| 2,989,829 A | 6/1961 | Heth et al. |
| 3,007,297 A | 11/1961 | Halls et al. |
| 3,043,073 A | 7/1962 | Bornzin |
| 3,101,578 A | 8/1963 | Johnston |
| 4,265,076 A | 5/1981 | Krutz |
| 4,580,395 A | 4/1986 | Castoldi |
| 5,152,127 A | 10/1992 | Koegel et al. |
| 5,396,755 A | 3/1995 | Arnold |
| 5,423,165 A | 6/1995 | Walch et al. |

OTHER PUBLICATIONS

Hesston Self–Propelled Windrowers Models 8100,8200,8400 –no date.
John Deere Windrowing Equipment –no date.
MacDon 960 Premier 2900 Series Self–Propelled Windrowers –no date.
Hesston Sickle Type Mower Conditiioners Models 1170, 1160, 1150, 1130, 1120, & 1110 –no date.
New Holland Speedrower Self Propelled Windrowers 2450 & 2550 –no date.

Primary Examiner—Robert E. Pezzuto
(74) Attorney, Agent, or Firm—Wells St. John P.S.

(57) ABSTRACT

A crop conditioning system to reduce the drying time of crops. The invention generally provides a framework, a fixed roller mounted on the framework, a movable roller mounted on one or more bellows which are mounted on the framework and a source of compressed gas or air for the bellows. The invention also provides a compressible roller sleeve which reduces down time due to jamming or clogging of the rollers with slugs and other debris, which includes a compressible base mat and a plurality of platform surfaces.

11 Claims, 15 Drawing Sheets

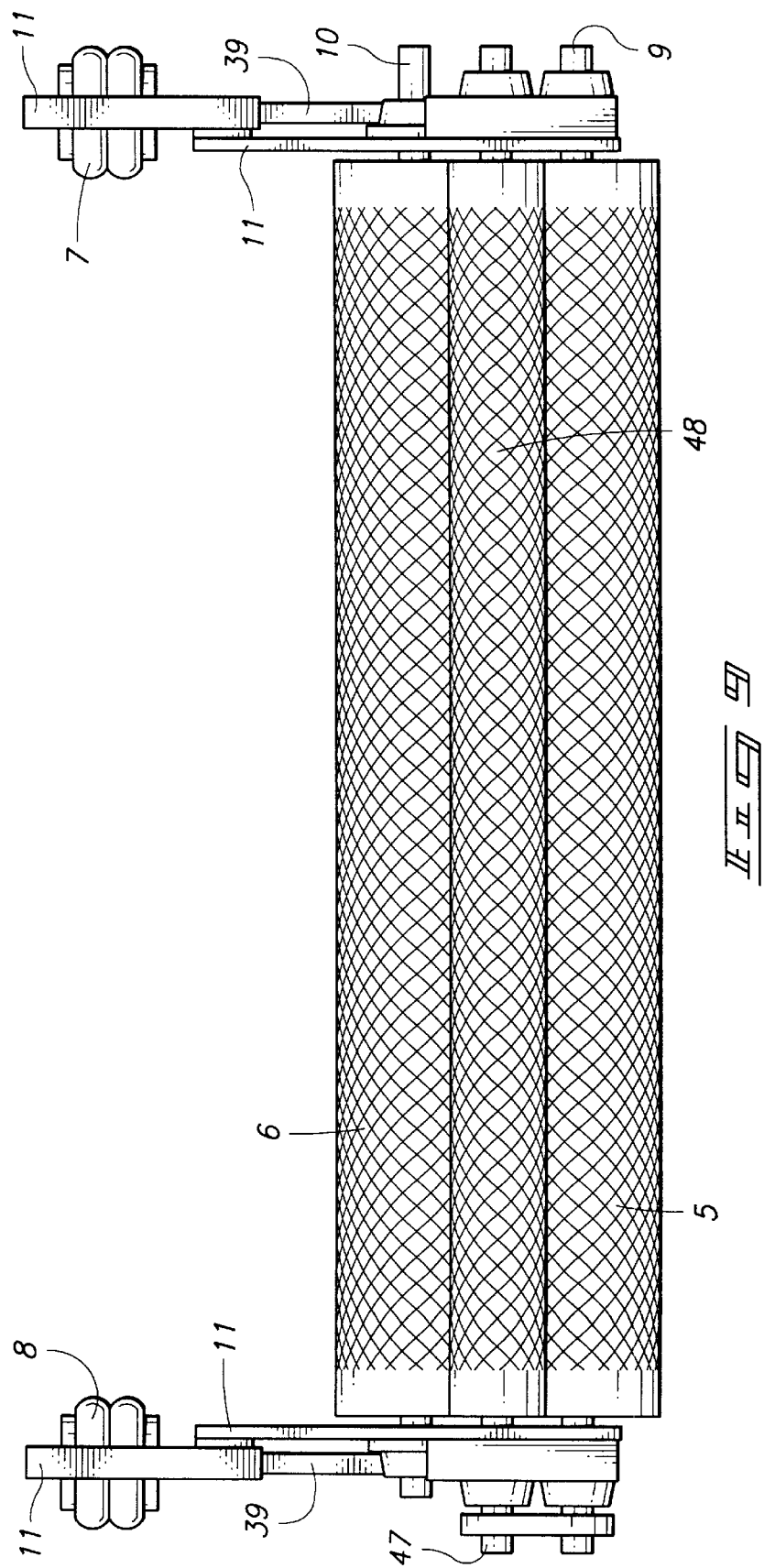

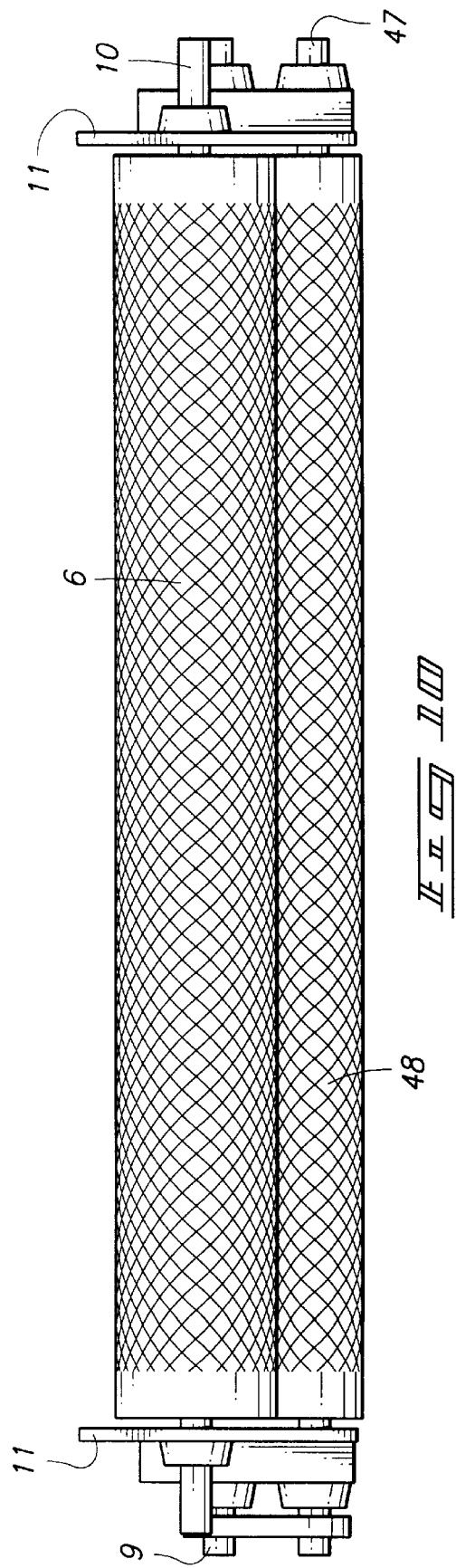

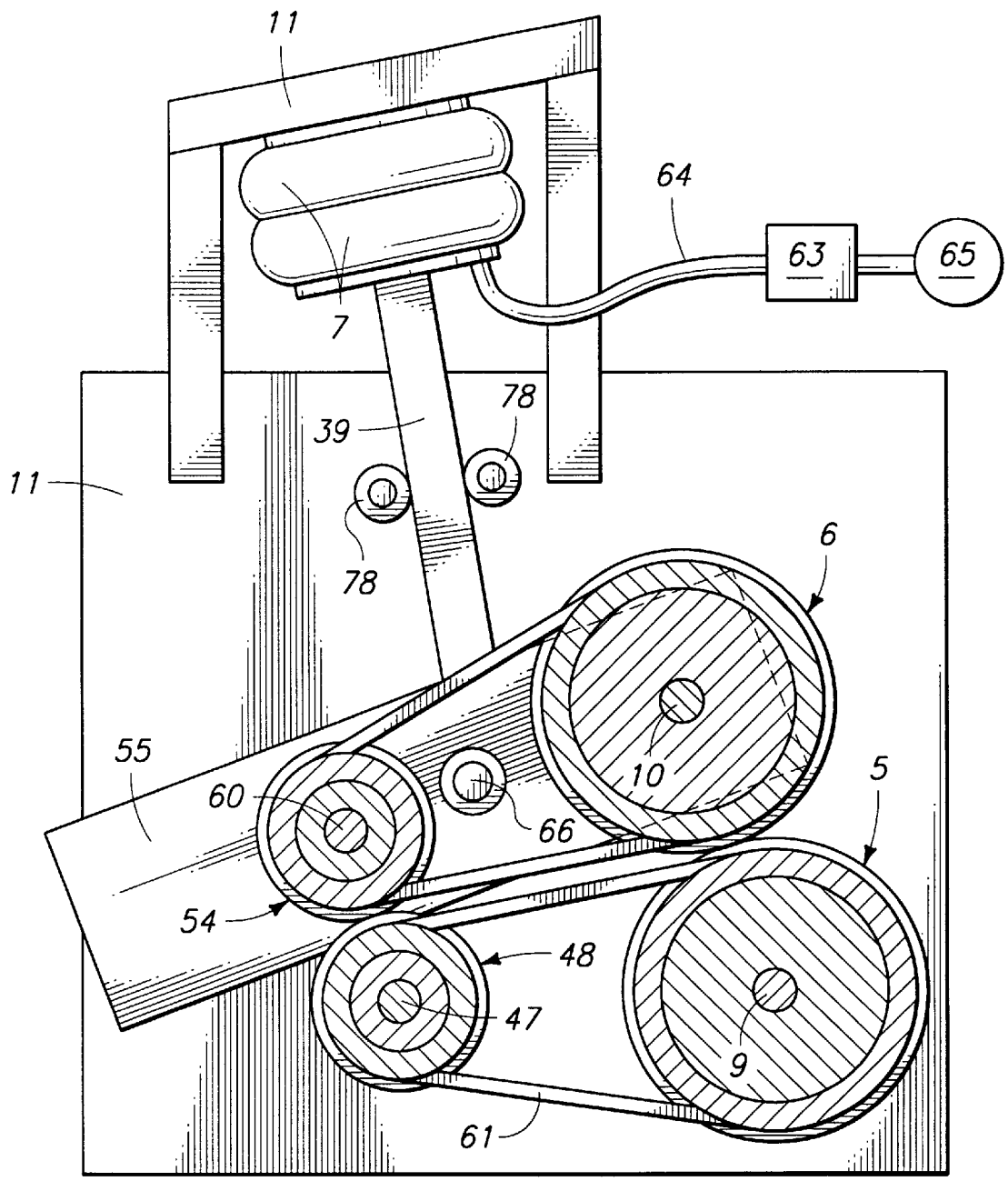

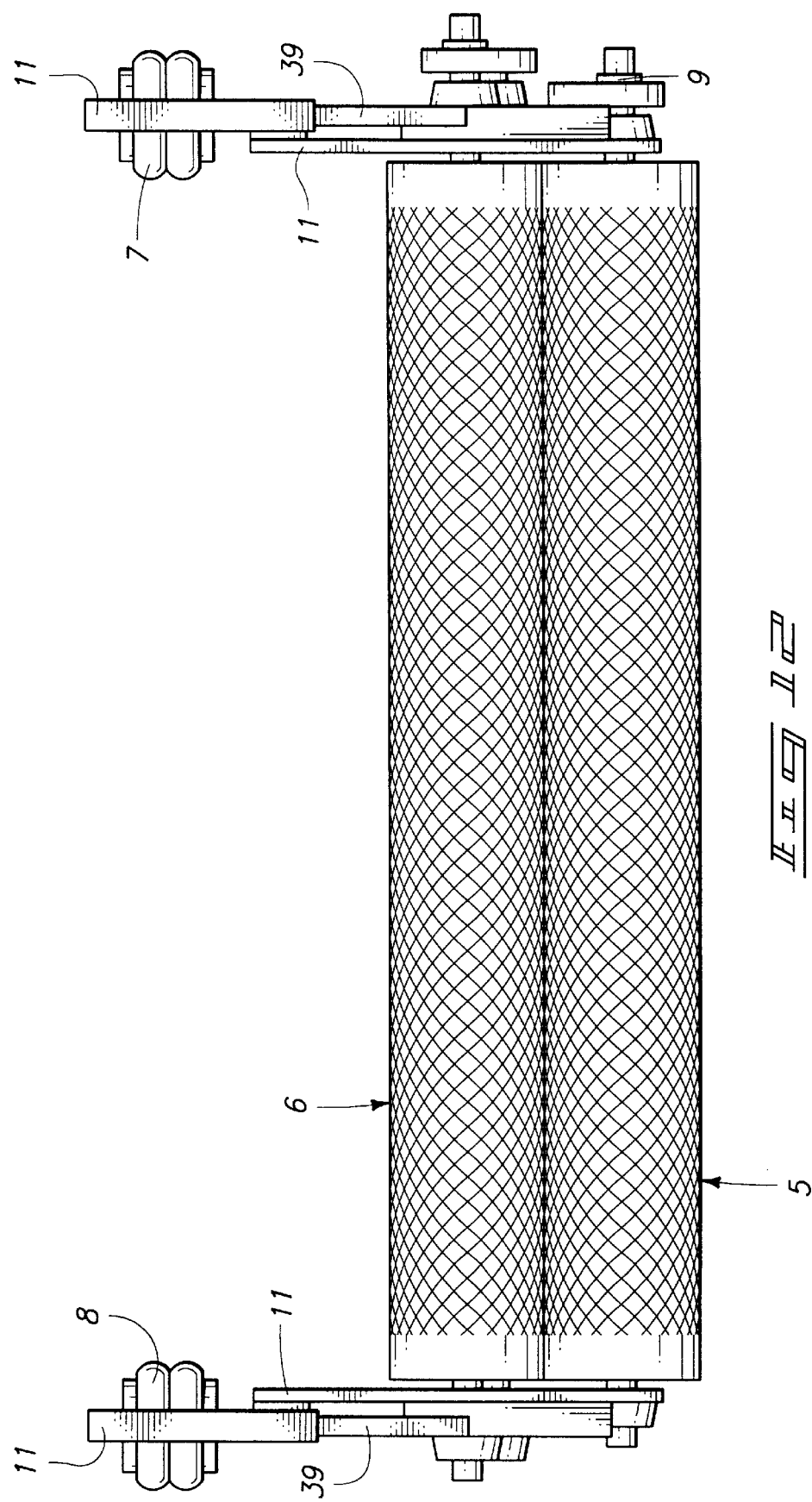

CROP CONDITIONING SYSTEM

CROSS-REFERENCES TO RELATED APPLICATIONS

The present application is a continuation-in-part application to U.S. patent application Ser. No. 09/015,417 filed Jan. 29, 1998, now U.S. Pat. No. 6,050,070.

TECHNICAL FIELD

The present invention relates to a system for the conditioning of various crops or foliage as the crop is cut in the field, for use in the agricultural and farming industry. The conditioning facilitates the removal of moisture from the crop, reducing drying time, and allows the crop to be further handled sooner.

BACKGROUND OF THE INVENTION

When a crop such as hay or alfalfa is cut in the field, a windrower or swather is generally utilized. The windrower typically includes cutting surfaces to sever the fiber of the crop and the cut crop is left in a row in the field to dry before it is bailed or otherwise handled.

The time that it takes the crop to dry in the field before it can be bailed or further handled can become critical. It is very important to shorten that time as much as possible to avoid numerous problems that may be encountered with the crop.

Devices referred to as conditioners are generally utilized to reduce the moisture in the crop, and/or to facilitate the faster drying of the crop. Conditioners are oftentimes mounted on a windrower, mower or other device, or they may be a separate unit. Conditioners currently available typically crimp and/or break down the stem of the hay and assist in the removal, or the facilitation of the moisture, in the fiber of the crop.

Conditioners typically include two or more elongated parallel rollers, slightly spaced apart from one another. The respective adjacent rollers rotate in opposite directions from one another such that the crop is fed through the gap between the two rollers. The rollers are typically made of steel, but with a rubber, elastomer or other compressible surface or coating around the circumference. The roller surface typically has raised intermeshing portions to further the gripping or crimping of the crop. Other conditioners use impact style rotors with outwardly extending projections to further assist in the crimping of the crop.

Conditioners or conditioning equipment may be operated as stationary equipment, mobile equipment, or combined with crop harvesting or swathing equipment.

During conditioning, the flow of the crop between the primary rollers varies and it is very difficult to therefore achieve a sufficiently consistent crushing or conditioning, especially in applications in which the rollers are slightly spaced apart. If a lower volume of crops is passing through, there may be wholly insufficient pressure applied to accomplish acceptable conditioning. Too large of a volume of crop may likewise create mechanical problems, as will other objects such as rocks, debris and the like.

Conditioners are operated in a relatively harsh environment in the field and every joint, seal, mechanism, mechanical part and connection is a potential reliability and maintenance problem.

Further, a significant problem for many years has been the inability for the conditioners to pass a slug (i.e. a compacted mass of crop, dirt and/or other material), or other debris which seem to regularly become lodged between the rollers. When a typical prior conditioner receives a slug or other debris which cannot be passed through the rollers due to its size or other factors, the conditioners have to be stopped and the problem must generally be manually removed by turning the rollers in reverse, or worse. This results in substantial down time and the expense associated with down time.

Slugs or debris, such as hay balls, stringy wet hay, or too much hay too fast, cause significant problems. The clogging of the conditioner requires the operator to clear the slugs or debris to allow them to pass on the own. If a wad passes on its own, a large amount of unconditioned material also passes with it. When baled, the unconditioned material is not as dry as the rest of the material and can form a hot spot or charred area in bales.

It is therefore an object of this invention to provide a conditioning system which minimizes the number of joints, mechanisms, mechanical parts, seals, connections and maintenance, while maximizing the reliability of the conditioner. This invention accomplishes these objectives by providing a bellows to impart a force on a movable roller toward a fixed roller which: does not have a fixed body; has unrestricted instantaneous response; provides variable loading angles; does not require or use mating mechanical parts which are much more likely to fail; and which does not require a piston, shaft or seals.

It is therefore an object of this invention to provide a conditioning system through which larger than expected objects may pass without substantially damaging the conditioner, which breaks the objects into pieces so the pieces may be passed through, and which helps keep the slugs or objects from forming. This invention accomplishes this object by providing a movable roller mounted on a pivot arm. While a significant force may be imparted on, or applied to, the movable roller to a fixed roller, the movable roller may retract under circumstances where a greater force is applied the opposite direction.

It is a further object of this invention to provide a conditioning system which substantially reduces the drying time of the conditioned crops.

It is a further object of this invention to provide a versatile conditioner, such that depending on the application, two, three, four or more rollers may be used in combination to condition the crop.

It is a still further object of this invention to provide a conditioner which may be installed on existing equipment as a retrofit, or installed on new equipment.

It is yet another object to provide a conditioning system wherein the rollers or roller sleeves destroy certain slugs or wads attempting to pass through the conditioning system. This system accomplishes this object by providing a compressible roller sleeve with a base surface and a plurality of raised surfaces or raised platforms. The two interacting roller sleeves with these surfaces have the advantage of destroying or breaking up many of the wads or slugs which attempt to pass through the conditioning system.

The prior art discloses intermeshing rollers wherein the higher raised portions interact or intermesh with one another, which has the disadvantage of not allowing slugs, wads and other debris to pass through.

It is believed that this invention has the additional advantage of requiring less horse power than prior conditioners.

The numerous advantages and resulting savings in cost and time from this invention are therefore obvious and easily recognized by those of ordinary skill in the art.

BRIEF DESCRIPTION OF THE DRAWINGS

Preferred embodiments of the invention are described below with reference to the accompanying drawings, which are briefly described below.

FIG. 9 is a rear elevation view of one embodiment of a three roller conditioner configuration;

FIG. 10 is a top view of one embodiment of the three roller conditioner configuration illustrated in FIG. 9;

FIG. 12 is a rear elevation view of one embodiment of a four roller conditioner configuration;

FIG. 13 is a top view of one embodiment of the four roller conditioner configuration illustrated in FIG. 11;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Many of the fastening, connection, process and other means and components utilized in this invention are widely known and used in the field of the invention described, and their exact nature or type is not necessary for an understanding and use of the invention by a person skilled in the art or science, and they will not therefore be discussed in significant detail. Furthermore, the various components shown or described herein for any specific application of this invention can be varied or altered as anticipated by this invention and the practice of a specific application of any element may already be widely known or used in the art or by persons skilled in the art or science and each will not therefore be discussed in significant detail.

The term framework is generally used herein to refer to any framework or structure which houses, supports, or provides the framework for the rollers and other components of this invention. It is meant to be construed broadly and it is not limited to any specific embodiment. For example, this conditioner can be used in combination with numerous different types of existing equipment, such as swathers and others. Therefore, a header on existing equipment may serve as the framework or part of the framework for this invention.

There are numerous ways known to those of ordinary skill in the art to provide rotational drive to the rollers, such as motors, hydraulic motors, engines, or any other source of rotation, none in particular of which are required to practice this invention, and will not therefore be discussed in any greater detail.

The term operationally placed as used herein in the context of the bellows being operationally placed, is intended to broadly include all mountings to the framework or to a roller, so long as the bellows is placed such that a force is imparted on the movable roller toward the fixed roller.

Figure 1:
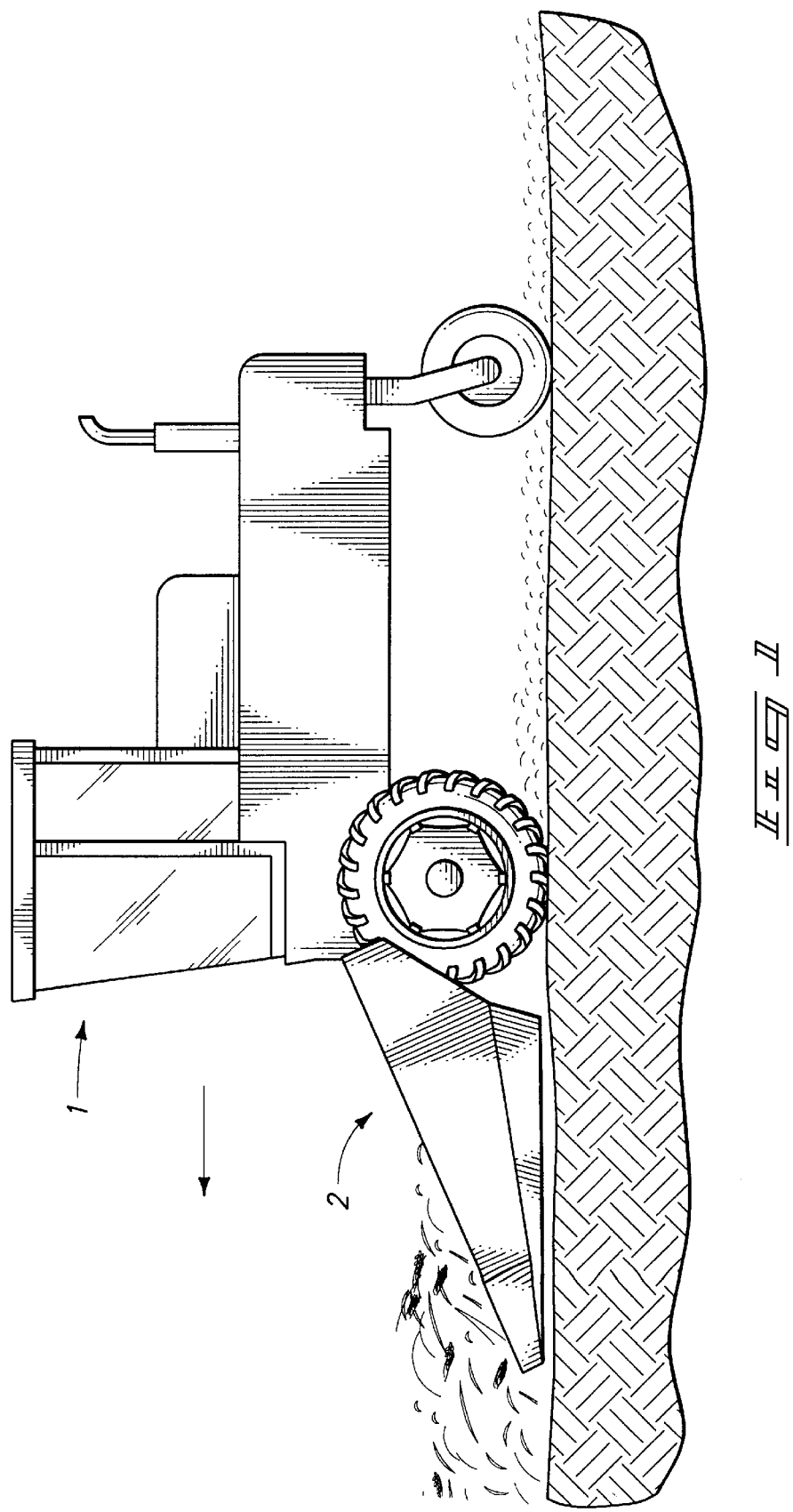
FIG. 1 is an elevation view of typical farm equipment which may either include a conditioner or to which a crop conditioner may be attached.

FIG. 1 illustrates typical farm equipment which may either include a conditioner or to which a crop conditioner may be attached. Figure one illustrates a self propelled windrower 1 with a forwardly mounted crop cutting and conditioning assembly 2.

Figure 2:
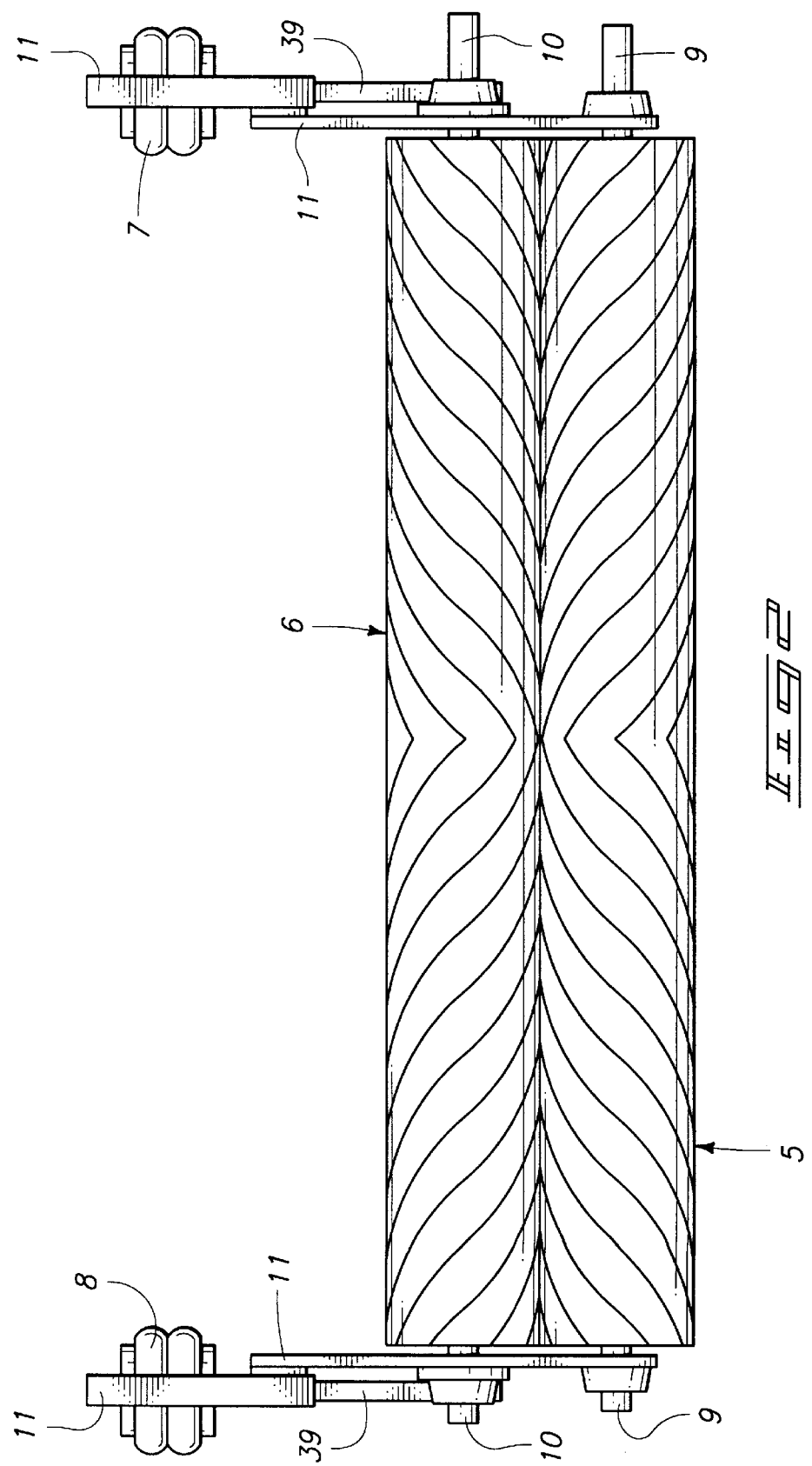
FIG. 2 is a rear elevation view of one embodiment of a two roller conditioner configuration as contemplated by this invention.

FIG. 2 is a rear elevation view of one embodiment of a two roller conditioner configuration as contemplated by this invention. Fixed roller 5 is securely attached to framework 11 and rotates about fixed roller axis 9. Moveable roller 6 is movably mounted relative to framework 11 and is approximately parallel to and abutting the fixed roller 5. Moveable roller 6 rotates about moveable roller shaft 10. The rollers are generally cylindrical in shape.

First bellow 7 is mounted to framework 11 and second bellow 8 is also mounted to framework 11. Moveable roller 6 is mounted to bellow connector arms 39 through which the force of first bellow 7 and second bellow 8 are imparted on moveable roller 6 toward fixed roller 5.

This invention is not limited to a two-roller configuration, but includes a two-roller configuration, three-roller configuration, four-roller configuration, and additional configurations, all within the scope of this invention.

Fixed roller 5 and moveable roller 6 are preferably rotatably mounted utilizing spherical bearings. In operation, the rollers are each rotated in the range of 600 revolutions per minute to 1000 revolutions per minute.

The movable roller 6 is shown mounted in force receiving disposition to the bellows such that the force from the bellows is imparted on the movable roller 6 to push it toward the fixed roller 5. Although it is preferred that the movable roller 6 be mounted to bellows through the bellows connector arm, it is not necessary to practice this invention so long as the movable roller is in force receiving disposition to the bellows.

The movable roller 6 is also placed in slidable relation to the framework 11, and mounted approximately parallel to the fixed roller. Since roller 6 is movable, it slides with respect to the framework 11 and with respect to the fixed roller 5.

Figures 3, 4:
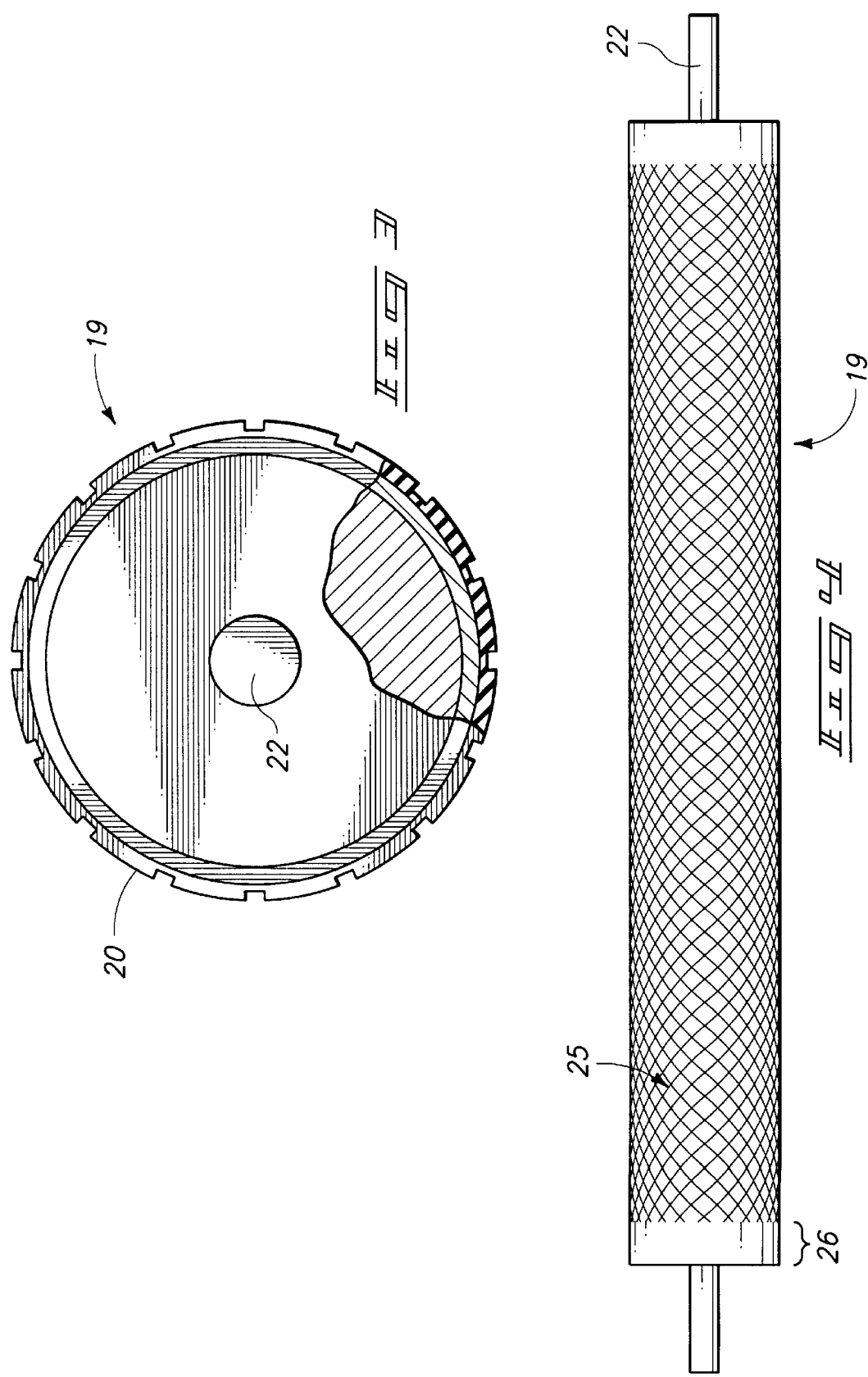
FIG. 3 is a side elevation view of one embodiment of a roller as contemplated by this invention.
FIG. 4 is an elevation view of one embodiment of a roller as contemplated by this invention.

FIG. 3 is a side elevation view of one embodiment of a roller as contemplated by this invention. FIG. 3 illustrates one example of a roller 19 with a steel core rotatably mounted about roller axis 22. The steel core preferably has a compressible surface 20 or roller sleeve, mounted on it, such as rubber, elastomer or neoprene.

While it is preferred for the rollers to have a rubber, neoprene or other compressible surface, it is not necessary to practice this invention, as other surfaces may also be used, or combinations of surfaces.

The roller surface may be imparted with any one of a number of different patterns, which may be grooves or raised areas, to achieve a grabbing effect on the crop being conditioned and which may enhance the crushing of the crop as it is conditioned. The raised areas combined with the grooves have the additional advantage and effect of passing or breaking up slugs and other debris.

FIG. 4 is an elevation view of one embodiment of a roller as contemplated by this invention. FIG. 4 illustrates one potential pattern on example roller 19, illustrating a diamond pattern. It should also be noted on the far side there is a wear band area 26 where no pattern is provided. The exemplary diamond pattern would extend the remaining length of the roller, with the exception of a second wear band area 26 at the other end of the roller.

Exemplary roller 19 rotates about roller axis 22. The pattern is indicated as item 25.

Figure 5:
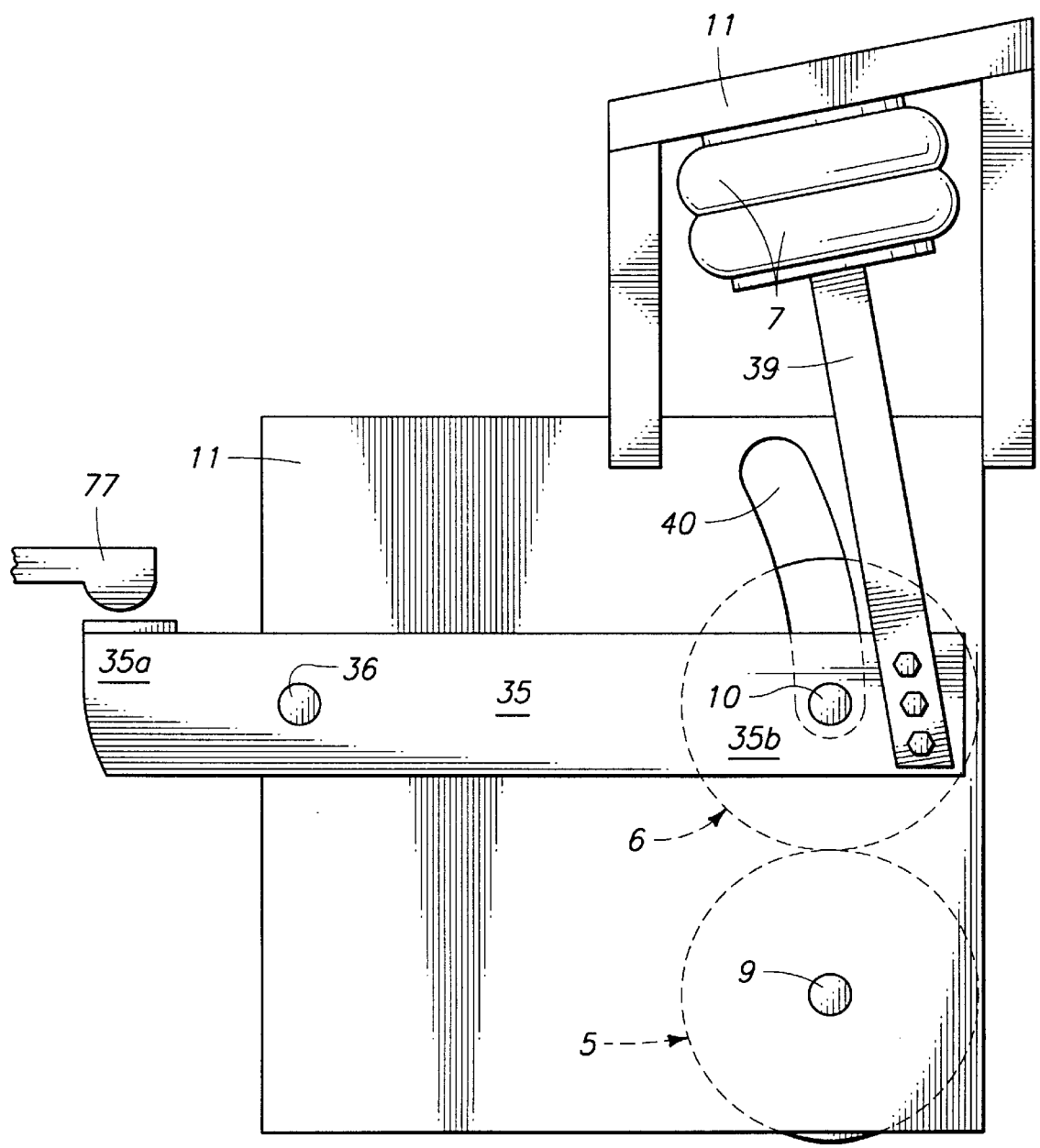
FIG. 5 is a side elevation view of one embodiment of a two roller configuration, with bellows, as contemplated by this invention.

FIG. 5 is a side elevation view of one embodiment of a two roller configuration, with bellows, as contemplated by this invention. FIG. 5 illustrates framework 11, bellows 7 mounted to framework 11, along with bellows connector arm 39 mounted to pivot arm 35. Pivot arm 35 is pivotally mounted to framework 11 about pivot arm mount point 36.

FIG. 5 illustrates a moveable roller guide 40 or slot in framework 11. FIG. 5 further shows fixed roller 5, fixed roller axis 9, moveable roller 6, rotatably mounted about moveable roller axis 10.

FIG. 5 further shows an additional mechanism of one embodiment of the invention which allows the moveable roller 6 to be separated from the fixed roller 5 to provide a sufficient gap between the two rollers to allow objects and debris to pass through.

In applications in which the framework 11 is mounted on the header of the conditioner for example, the header may be raised by the operator of the conditioner. When the header and consequently the framework 11 is raised, the first end 35a of pivot arm 35 contacts stop 77, thereby causing the pivot arm 35 to rotate about pivot arm mount point 36, such that, as can be seen in FIG. 5, the second end 35b of pivot arm 35 is rotated or pushed away from fixed roller 5. This overcomes the force exerted by the bellows 7 and pushes the moveable roller 6 away from the fixed roller 5, and causes a gap between fixed roller 5 and moveable roller 6, which allows for debris and other material to pass between the fixed roller 5 and the moveable roller 6.

The combination of the bellows and its application of force result in a better breakdown of the cellulose layer on the surface of the crop such as hay, being crushed. The substantial crushing (as opposed to mere crimping) of this outer surface, allows the moisture contained within the plant, to be released much faster and more thoroughly.

Figure 6:
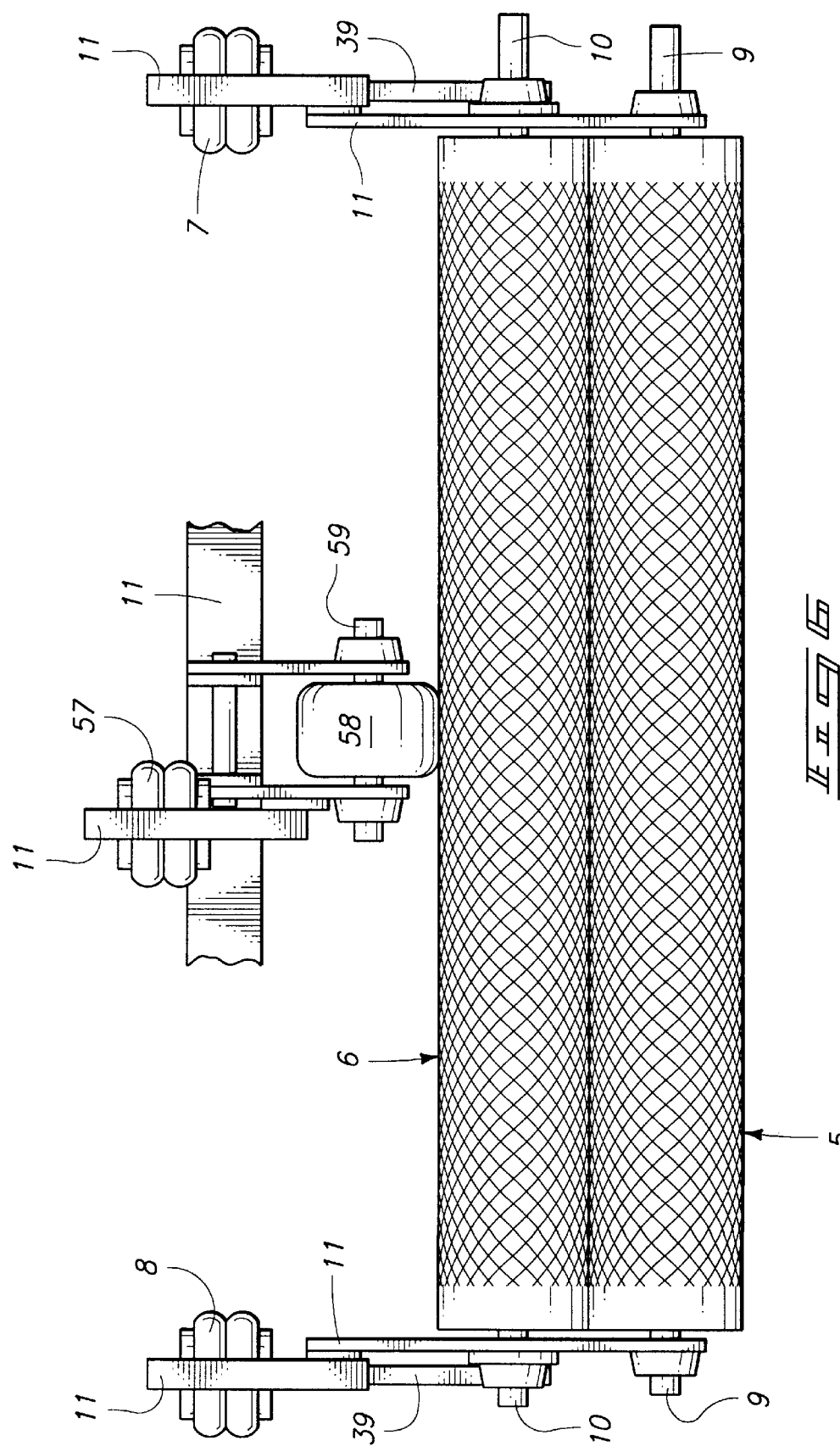
FIG. 6 is a rear elevation view of one embodiment of a two roller conditioner configuration, with an intermediate supplemental bellows.

FIG. 6 is a rear elevation view of one embodiment of a two roller conditioner configuration, with an intermediate supplemental bellows. FIG. 6 illustrates fixed roller 5, moveable roller 6, fixed roller axis 9, and moveable roller axis 10.

FIG. 6 further illustrates first bellow 7 and second bellow 8 mounted to framework 11 and operatively connected to moveable roller 6 through bellows connector arm 39 to impart a force on moveable roller 6 toward fixed roller 5. The desired magnitude of force is applied to push or force moveable roller 6 against fixed roller 5.

FIG. 6 further illustrates a potential embodiment of this invention whereby a supplemental force roller is applied at an intermediate point to moveable roller 6. The supplemental force is generally comprised of third bellow 57 mounted to framework 11 and which applies a force to moveable roller 6 through supplemental roller 58 which rotates about supplemental roller axis 59. The supplemental force may also be from a known force application means, such as a spring for example. The supplemental roller may also be referred to an idler wheel and it may be constructed of any materials, similar to the other rollers or otherwise. Preferably the supplemental roller 59 will be a steel, cylindrically shaped object with a rubber, elastomer or neoprene surface, similar to fixed roller 5 or moveable roller 6.

The supplemental roller may be used to assure sufficient force toward the center of moveable roller 6 to assure more even and consistent pressure across moveable roller 6.

A second and similar supplemental roller may be applied to fixed roller 5 if necessary to achieve this desired result.

Figure 7:
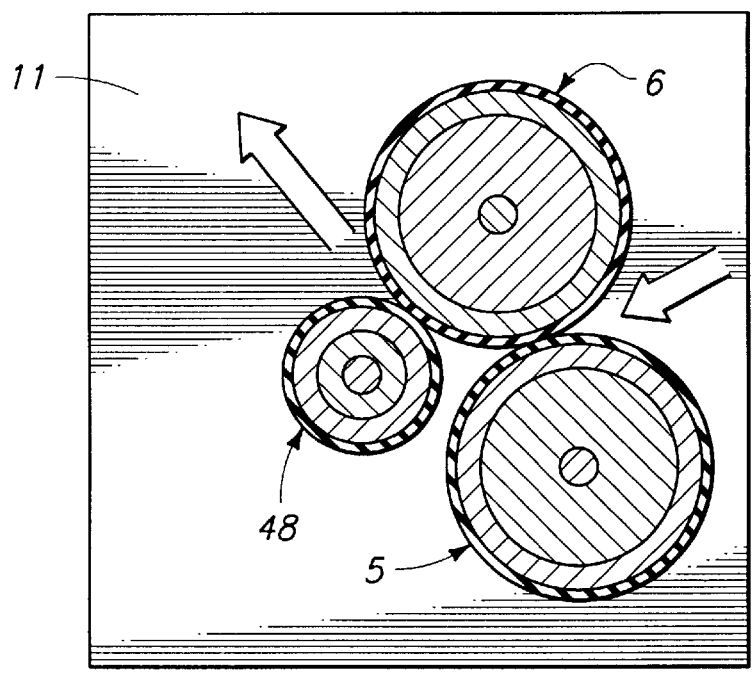
FIG. 7 is a side elevation view of a three roller configuration within the contemplation of this invention.

FIG. 7 is a side elevation view of one three roller configuration within the contemplation of this invention. FIG. 7 is an illustration of a potential configuration or embodiment whereby three rollers are utilized as contemplated by this invention. FIG. 7 illustrates fixed roller 5, moveable roller 6, framework 11, and third roller 48.

In the illustration shown in FIG. 7, third roller 48 may either be fixed or moveable, by the same mechanisms and methods described herein with respect to the other rollers.

Figure 8:
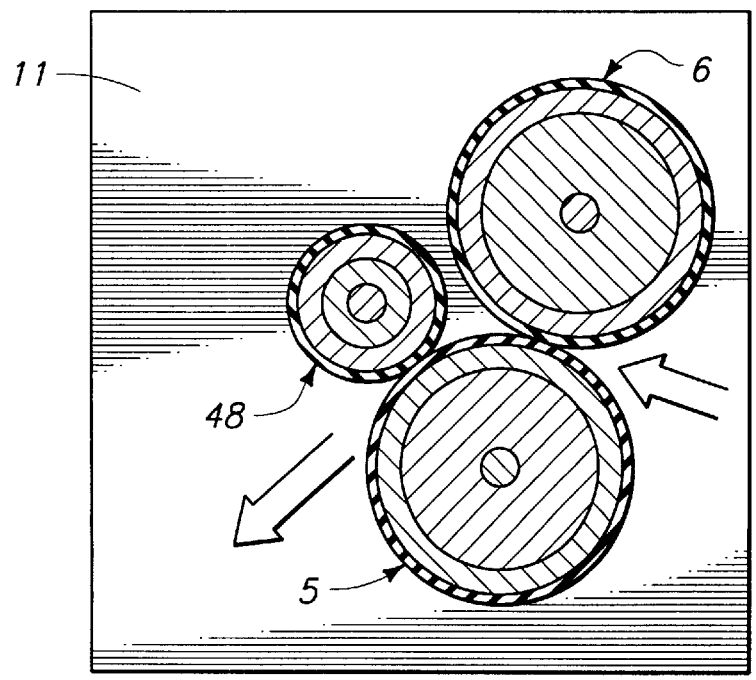
FIG. 8 is a side elevation view of a three roller configuration within the contemplation of this invention.

FIG. 8 is a side elevation view of a second embodiment of a three roller configuration within the contemplation of this invention. FIG. 8 shows fixed roller 5, moveable roller 6, framework 11, and third roller 48. However, in FIG. 8, third roller 48 is abutting against fixed roller 5 and therefore would preferably be a moveable roller with the bellows and similar mechanisms to impart a force through third roller 48 to fixed roller 5.

FIG. 9 is a rear elevation view of one embodiment of a three roller conditioner configuration. FIG. 9 illustrates a rear view of the configuration shown in FIG. 8. FIG. 9 shows first bellow 7, second bellow 8, framework 11, fixed roller 5, moveable roller 6, and third roller 48. Fixed roller 5 rotates about fixed roller axis 9, moveable roller 6 rotates about moveable roller axis 10, and third roller 48 rotates about third roller axis 47.

FIG. 10 is a top view of one embodiment of the three roller conditioner configuration illustrated in FIG. 9. FIG. 10 shows a top view of the configuration illustrated in FIG. 8, showing framework 11, moveable roller 6, and third roller 48.

Figure 11:
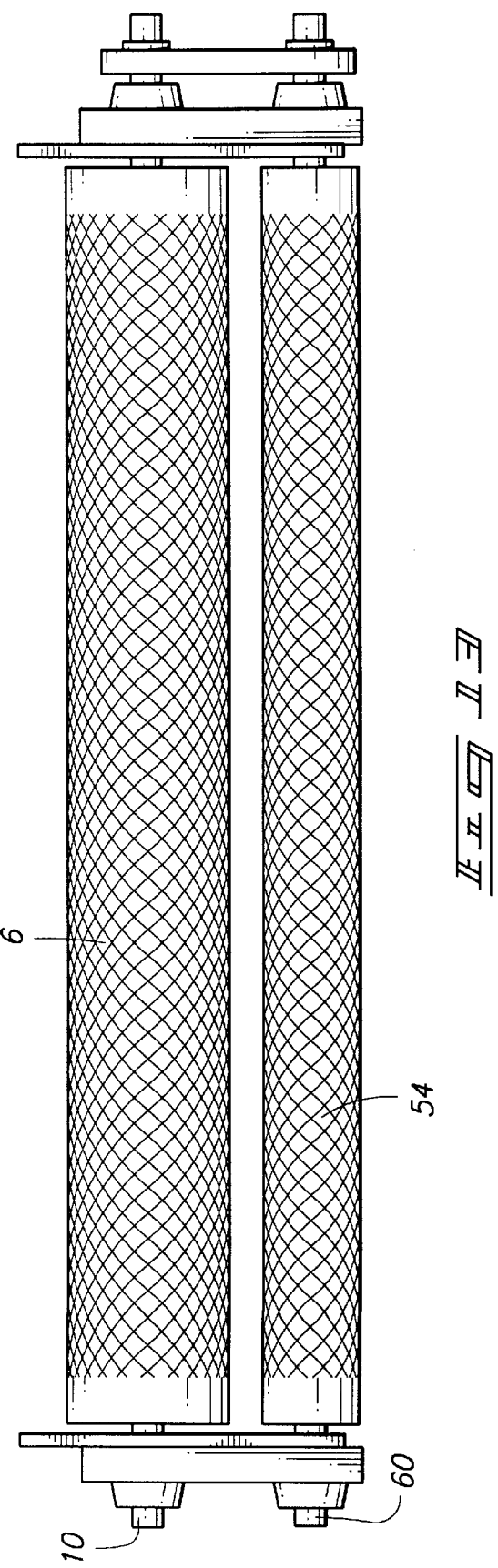
FIG. 11 is a side elevation view of one embodiment of a four roller configuration, with bellows, as contemplated by this invention.

FIG. 11 is a side elevation view of one embodiment of a four roller configuration, with bellows, as contemplated by this invention. FIG. 11 shows framework 11, first bellows 7 mounted on framework 11 and operatively connected to roller mount arm 55 through bellows connector arm 39.

Roller mount arm 55 is pivotally mounted at an intermediate point 66 on roller mount arm 55 to bellows connector arm 39.

FIG. 11 further shows fixed roller 5 rotatably mounted on framework 11 about fixed roller axis 9. A third roller 48 is rotatably mounted to framework 11 about third roller axis 47 and rotatably and operatively connected to fixed roller 5 via drive belt 61.

FIG. 11 further illustrates fourth roller 54, which is a moveable roller and which is rotatably mounted about fourth roller axis 60 to roller mount arm 55. Roller mount arm 55 is pivotally mounted about pivot arm mount point 66.

The force imparted by first bellows 7 through bellow connector arm 39 achieves the desired force between the respective fixed rollers 5 and 48 and the respective moveable rollers 6 and 54. Guides 78 maintain the bellow connector arm 39 in position. Guides 78 may be any one of a number of different types of guides, with rollers being illustrated in FIG. 11.

FIG. 11 also illustratively shows air line 64 operatively connected to first bellows 7 and to air regulator 63, which in turn is operatively connected to a source of air 65, which may be an air tank. A bellows for use in this invention may be purchased from the Firestone Industrial Products Company, under the Airsprings mark or designation. The term bellows as used herein is used to describe what are traditionally referred to as bellows, but also to include other flexible or semi-flexible gas enclosures or containers which may hold compressed gas (preferably air) and impart a force. This would include without limitation diaphragm devices, air bags, air springs and the like.

With the use of the bellows in this invention and the advantages provided by such a system, a control may, but need not be placed in the cab of the vehicle which allows the operator to release the air pressure from inside the cab, to release objects, without being required to get out of the cab and manually remove the object in the field.

In a further embodiment of this invention, and as set forth more fully in reference to FIG. 5, a stop 77 may be used to temporarily separate the two rollers to allow debris and slugs to pass through. The further advantage of this approach is that it eliminates the necessity for carrying a source of air on vehicle or conditioner for the bellows 7. Instead, the bellows 7 may be initially filled with compressed air or gas to the desired level from a service vehicle or even a compressor in the farmer's pickup, and it will typically maintain that air pressure and not require the additional gas compressor.

FIG. 12 is a rear elevation view of one embodiment of a four roller conditioner configuration. FIG. 12 illustrates framework 11, first bellows 7, second bellows 8, bellow connector arm 39, fixed roller 5,and moveable roller 6.

FIG. 13 is a top view of one embodiment of the four roller conditioner configuration illustrated in FIG. 11. FIG. 13 illustrates fourth roller 54 rotatably mounted about fourth roller axis 60, and moveable roller 6 rotatably mounted about moveable roller axis 10.

The bellows described herein may be any one of a number of different types of bellows for providing a source of air pressure and the rapid responsiveness of a bellows for the invention. The bellows may receive a source of air from any one of a number of different sources, including air lines going through an air compressor and various available and known actuators or valves may be utilized to provide the sufficient source of consistently pressured air and rapid responsiveness to practice this invention.

Figure 14:
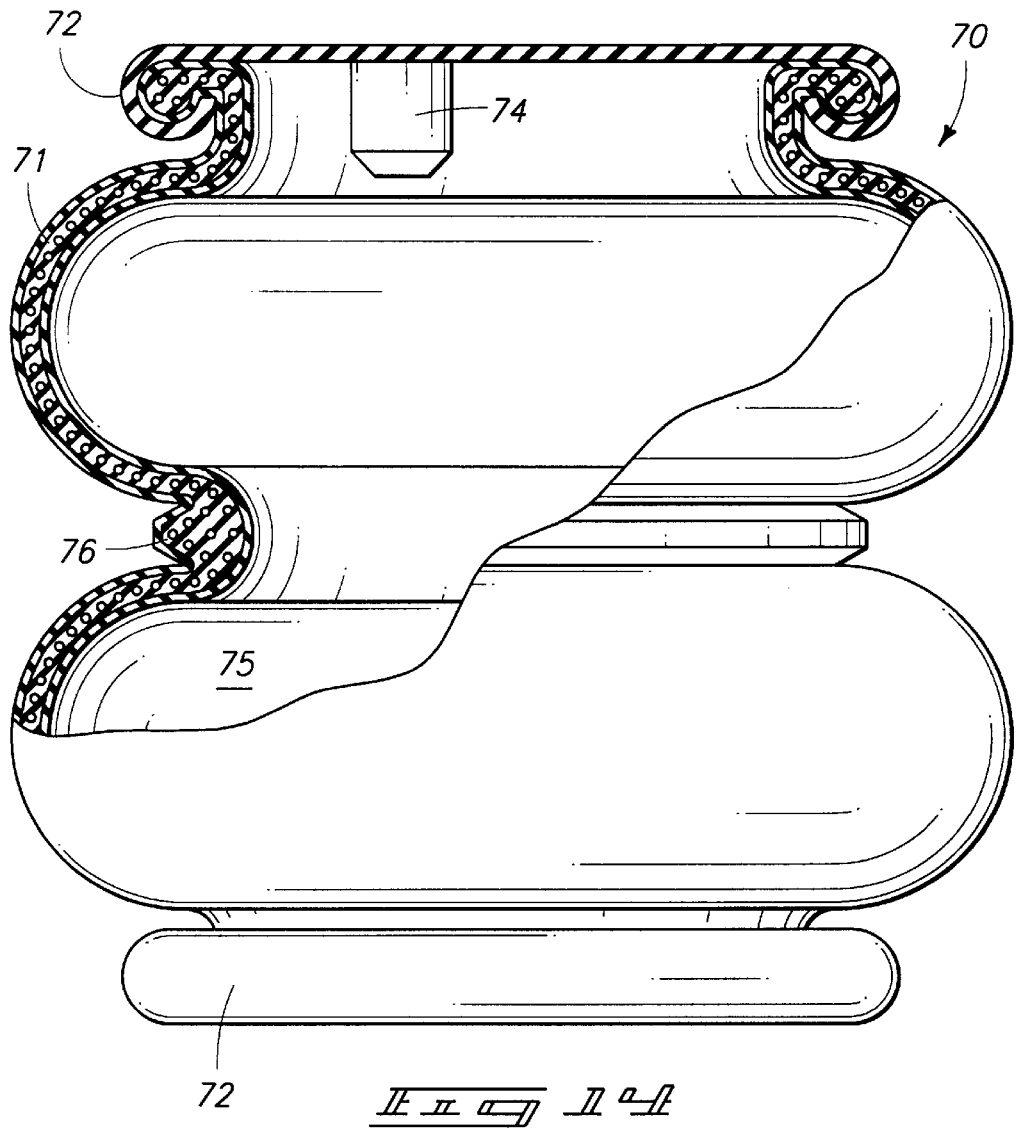
FIG. 14 is an elevation cutaway view of one embodiment of a bellows which may be used in this invention.

FIG. 14 is an elevation cutaway view of one embodiment of a bellows 70 which may be used in this invention. FIG. 14 illustrates the bellows 70, with a gas chamber 75 and side wall 71. For practical reasons, the preferred gas is air. The side wall may be constructed with any one of a number of different materials, including multiple layers or plies, including cord reinforced fabric, elastomerics, rubber, neoprene, and the like, with no one in particular being required to practice this invention.

Bead plate 72 may be permanently attached, with air fitting aperture 74 providing an inlet for the compressed gas to be provided to the gas chamber 75. A bellows support ring 76 may be used to provide additional support between the upper and lower chamber areas in the bellows shown, although the ring is not necessary to practice this invention. An air inlet line would be operatively connected to the bellows 70 via the air fitting aperture 74 to provide the source of compressed gas or air. A variable air regulator may be provided to adjust the gas or air pressure within the bellows.

Furthermore, the advantage of the use of bellows is that from the cab of the vehicle, tractor or other equipment, when a slug or other debris is encountered, a manual gas or air release switch may release the gas from the bellows, thereby reducing or removing the pressure between the rollers, and consequently allowing the slug or debris to pass through the rollers. This effectively clears the slugs and debris.

The compressed air may be provided from a number of different sources, none of which are necessary to practice this invention, such as a mechanically powered air compressor or a charged air supply tank.

The typical current preferred pressure of compressed gas provided to the bellows is in the range of thirty five to sixty pounds per square inch (psi), although the bellows can hold as high as one hundred twenty pounds per square inch pressure. The force exerted will depend on the size of the bellows, for instance a nine inch bellows may need ninety pounds per square inch of compressed air or gas, whereas a twelve inch bellows may only need the thirty five to sixty pounds per square inch. Whatever combination of bellows and pressure in the bellows is used, the preferred pressure is approximately six thousand pounds on the movable roller. A specific magnitude of force is however not necessary to practice the invention.

Figure 15:
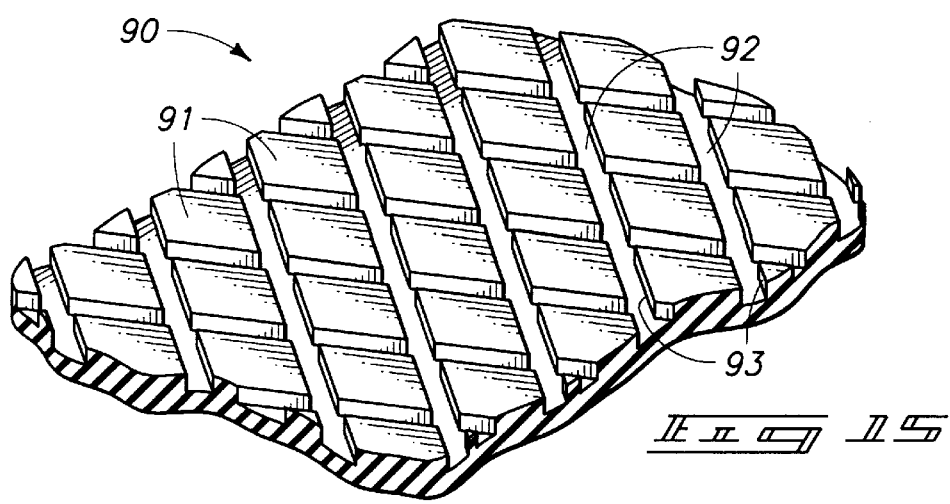
FIG. 15 illustrates the preferred pattern of raised surfaces utilized as the compressible outer surface on the rollers, as contemplated by this invention.

FIG. 15 illustrates the preferred embodiment of a roller surface pattern on the compressible roller surface or roller sleeve 90. The preferred roller sleeve may be generally comprised of a mat shape when not on the roller, and includes discontinuous raised platforms 91 or raised surfaces, with side surfaces 93, raised above the base surface 92. While the diamond shaped pattern shown in FIG. 15 the preferred way, a specific shape of raised platform 91 is not necessary to practice this invention, as many other platform shapes may be used, such as squares, rectangles, circles, hexagons, octagons, other polygons, or even helical gear-shaped to name a few.

The raised platforms 91 may preferably be raised above the base surface 92 in a range from about one-eighth of an inch to one inch. The raised platforms 91 may also be preferably separated from one another by a distance in the range of about one-eighth of an inch to one inch. The preferred percentage of the surface area of the plurality of raised platform surfaces, to the total surface area of the plurality of raised platforms and base surface, is in the range of fifty-one percent to ninety-five percent.

The configuration of a base surface 92 and raised platforms 91 has the advantage of preventing the formation of slugs and wads, and it functions to chew them up in the sense that it breaks then apart, reducing their size or eliminating them altogether. The configuration shown in FIG. 15 has more gripping effect on whatever is being conditioned.

The base mat of the roller sleeve is preferably molded right onto the steel roller base, when made of polyurethane, but need not be to practice this invention. If rubber is used, then it is preferably vulcanized to the steel roller. When a compressible base mat with a first side and a second side are used, and one of the sides are secured to the roller, this is intended to cover any way in which it is secured, including by being vulcanized, glued, or any other way.

When roller sleeves with the platform surfaces are used on both rollers, the combination of the roller surface interfaces, coupled with the rapid opening and closing response action of the bellows, has a destructive effect on the slugs and wads that would form in, and clog, a typical conditioner. When the combination of rollers with platform surfaces is used, there are groove to groove interactions, planar surface to planar surface interactions, and groove to planar surface interactions. These three different interactions generate differential forces, which serve to pinch, wedge, shred and differentially pull slugs and wads apart, and keep smaller ones from forming.

When the rollers are rotated at six hundred to one thousand revolutions per minute, the grooves between the platform surfaces are believed to act as a turbine in some ways with respect to the air flow and assist by drawing in an even flow of crop. The rotation of the rollers with the sleeves thereon creates a vacuum or vacuum effect in portions of the groove areas.

Figure 16:
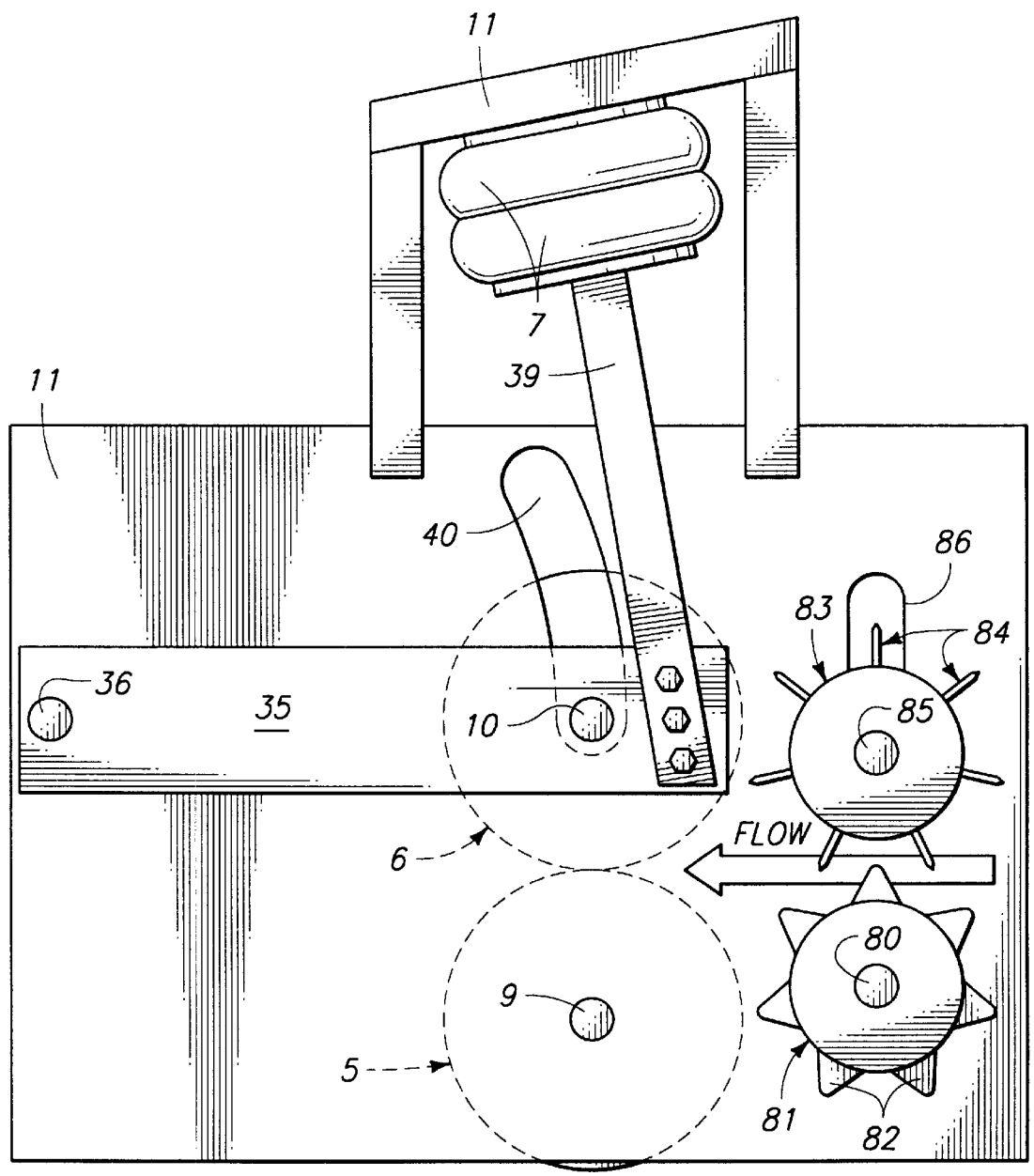
FIG. 16 is a side elevation view of one embodiment of a two roller configuration, with feeder rollers used to better facilitate the flow of material through the rollers.

FIG. 16 is a side elevation view of one embodiment of a two roller configuration similar to that shown in FIG. 5. Further illustrated in FIG. 16 is a feeder system which may be used in combination with the other features of this invention.

Similar to FIG. 5, FIG. 16 illustrates framework 11, bellows 7 mounted to framework 11, along with bellows connector arm 39 mounted to pivot arm 35. Pivot arm 35 is pivotally mounted to framework 11 about pivot arm mount point 36.

FIG. 16 also illustrates a moveable roller guide 40 in framework 11. FIG. 16 further shows fixed roller 5, fixed roller axis 9, moveable roller 6, rotatably mounted about moveable roller axis 10.

Fixed feeder roll 81 is mounted about fixed feeder roll axis 80, and may have a ribbed configuration on its outer surface, such as shown by the cross section view with ribs 82.

Movable feeder roller 83 rotates about movable feeder roll axis 85, but in its preferred form, is not fixed in place like fixed feeder roll 81. Instead, movable feeder roller 83 is movably mounted such that its weight, or force from another bellows, holds it in place as shown. However, if rocks, slugs or other large hard objects are passed between fixed feeder roll 81 and movable feeder roller 83, movable feeder roller 83 may be pushed up along slot 86 to allow the object to pass through without causing substantial damage to either or both of the feeder rolls.

Movable feeder roller 83 may include any pattern or combination of protrusions around its outer surface, such as flow guides or roller protrusions 84, shown in FIG. 16.

Figure 17:
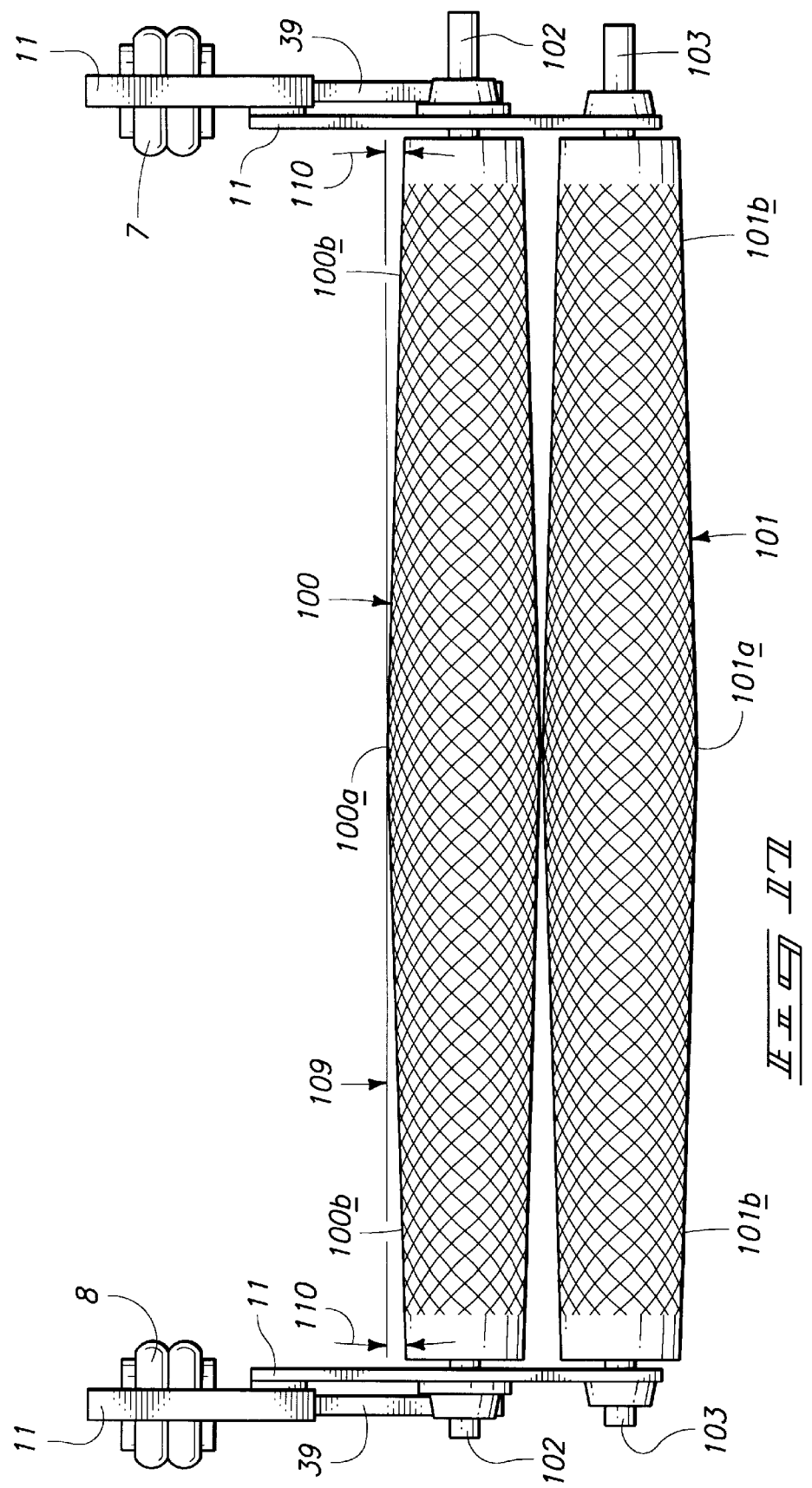
FIG. 17 is a rear elevation view of one embodiment of a two-roller conditioner configuration, wherein the rollers are tapered with a larger diameter toward the middle of the roller than at the outer ends.

FIG. 17 illustrates an embodiment of this invention wherein one or both of the rollers are tapered such that the diameter and circumference of the roller toward the center is greater than that toward the outer edges. The amount of taper is exaggerated in the Figure for purposes of illustration, and only shows one embodiment. Preferably, the rollers are tapered approximately 1/16 of an inch for the outer eighteen inches of longitudinal length on each side of the rollers. In an embodiment of the invention in which the rubber or rubber sleeve is vulcanized onto the roller, the tapering can occur either by grounding or during the vulcanization.

The base mat may also be created and secured to the roller body by taking disk shaped rubber pieces with a roller body aperture in the center, slipping the plurality of disk shaped rubber pieces over the roller body and compressing them all together and securing them on and around the roller body. The platform surfaces can then be created or machined in, as described above.

When pressure is imparted on the outer edges of the rollers, the taper helps compensate for the bend in the rollers at the outer edges and prevents the development of softer spots in the middle of the rollers as compared to the outer ends. Line 109 in FIG. 17 illustrates a planar line as compared to the taper. Angle 110 and the taper shown in FIG. 17 is exaggerated for illustrative purposes.

FIG. 17 illustrates movable roller 100 with a middle portion 100a and outer or end portions 100b. Fixed roller 101 likewise has middle portion 101a and outer portions or ends 101b. Movable roller 100 is mounted on movable roller axis 102 and fixed roller 101 is mounted on fixed roller axis 103.

While there are many different tapers which may be used as contemplated by this invention, the preferred taper is a taper of one-sixteenth (1/16) of an inch in every eighteen (18) inches of length of the roller.

Figure 18:
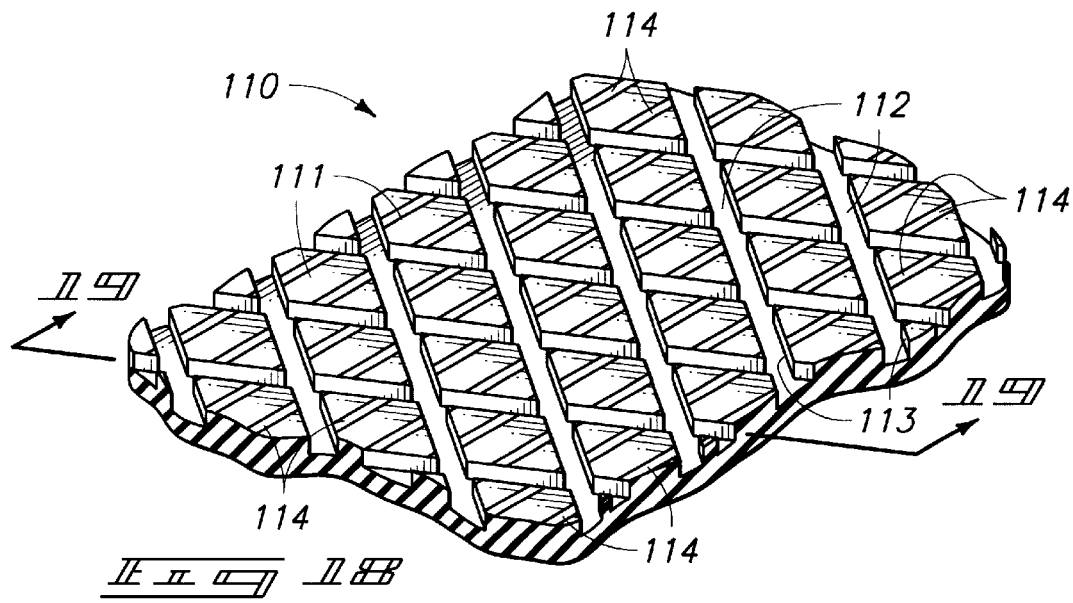
FIG. 18 illustrates the preferred pattern of raised surfaces utilized as the compressible outer surface on the rollers, but with grooves or gouges imparted on the outer surface for additional gripping.

FIG. 18 illustrates a resulting roller surface wherein a router dado blade has been used to rough up or gouge the outer surface portions of the roller pattern. The router dado blade may be preferably gouging the outer surface approximately one-sixteenth (1/16) of an inch deep and leaves a series of lines, which are believed to provide additional friction and grab for the material being conditioned through the rollers.

FIG. 18 illustrates a roughened surface which is preferably utilized to increase the grabbing of the raised platform surfaces, the preferred surface including router dado gouges 114 in and/or across a portion of the roller surface. FIG. 18 illustrates a compressible roller surface 110, raised platforms 111, the base surface 112, side surfaces 113 and the gouges 114 which are imparted by the router dado. The gouges 114 are preferably approximately one-sixteenth (1/16) of an inch in depth. While the term gouge is used herein, that term is used in a broader sense than its ordinary meaning, and is intended to include, without limitation, gouges, grooves, or roughened cavities from coarse grinding for instance, in the surface of the raised platforms 111.

Figure 19:
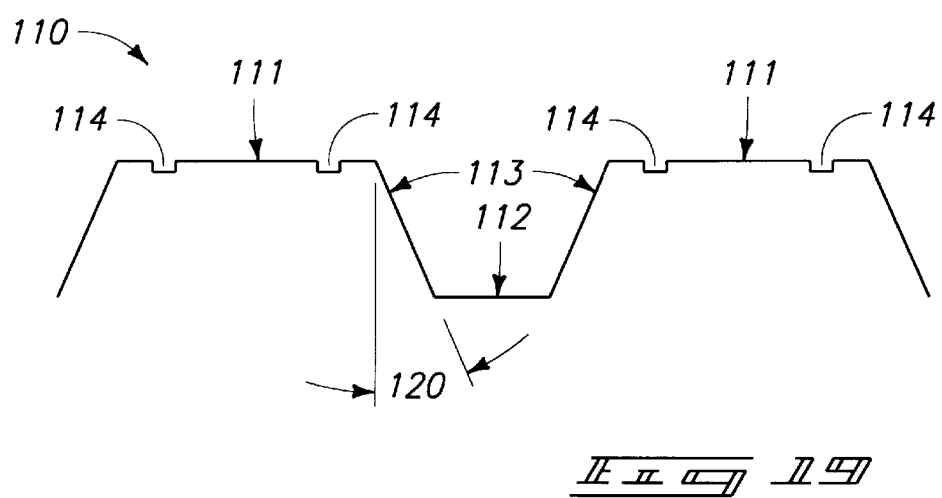
FIG. 19 is a cutaway section view from FIG. 18 and illustrates the raised platforms of the compressible roller sleeve.

FIG. 19 is a cutaway section view of the raised platforms 111 from FIG. 18 and illustrates the compressible roller surface 110, raised platforms 111, gouges 114, side surfaces 113 and base surface 112. It will be noted that in the preferred embodiment, the side surfaces 113 are not perpendicular to the raised platforms 111 or to the base surface 112, but instead are at angle 120, which is preferably ten (10) degrees.

It will be appreciated by those skilled in the art that angle 120 may be varied within the contemplation of this embodiment of the invention. It is believed that by angling the side surfaces 113, the compressible roller surface 110 exhausts mud and other debris more efficiently than if angle 120 was zero and side surfaces 113 were perpendicular to raised platforms 111.

A side by side test was conducted wherein the percentage moisture in cut hay was measured at hourly intervals, between a swather equipped with a bellowed conditioner as described by this invention, and a similar swather equipped with a currently available conditioner. The currently available conditioner used included standard rollers which crimp the crop, whereas the conditioner described herein included the bellows configuration disclosed herein, and rubber roller sleeves with longitudinal grooves along the length of the rollers.

While tests results will vary according to a number of different factors and conditions, it was found that the use of a conditioner as described by this invention significantly reduced the drying time and percentage moisture in the crop on the ground.

The desired moisture percentage before hay is baled for instance, is about twenty percent or less. By way of example only, the conditioner described herein achieved the desired twenty percent moisture within ninety six hours after harvest. The hay harvested with the prior art conditioner was at about forty percent moisture at the same ninety six hour interval, or twice the moisture. In the same test, after forty eight hours, the moisture in the hay which was conditioned by this invention was about thirty-four percent moisture, whereas at forty eight hours, the hay conditioned by a prior art machine, was at about fifty-three percent moisture.

In compliance with the statute, the invention has been described in language more or less specific as to structural and methodical features. It is to be understood, however, that the invention is not limited to the specific features shown and described, since the means herein disclosed comprise preferred forms of puffing the invention into effect. The invention is, therefore, claimed in any of its forms or modifications within the proper scope of the appended claims appropriately interpreted in accordance with the doctrine of equivalents.

I claim:

1. A crop conditioner comprising:
   a. a framework;
   b. an elongated fixed roller rotatably mounted to the framework, said fixed roller including a first end, a second end and a middle portion, wherein said fixed roller is tapered from the middle portion to the first end and from the middle portion to the second end;
   c. at least one a first bellows and a second bellows, each mounted to the framework;
   d. a first end of a movable roller mounted in force receiving disposition to the first bellows and a second end of the movable roller mounted in force receiving disposition to the second bellows, and the movable roller being mounted in slidable relation to the framework, mounted approximately parallel to and abutting the fixed roller and mounted in force imparting disposition to the fixed roller, and wherein the force imparted by the first bellows and the second bellows, on the movable roller, are approximately equal.

2. A crop conditioner as recited in claim 1, and further wherein said movable roller includes a first end, a second end and a middle portion, wherein said movable roller is tapered from the middle portion to the first end and from the middle portion to the second end.

3. A crop conditioner comprising:
   a. a framework;
   b. an elongated fixed roller rotatably mounted to the framework;
   c. at least one a first bellows and a second bellows, each mounted to the framework;
   d. a first end of a movable roller mounted in force receiving disposition to the first bellows and a second end of the movable roller mounted in force receiving disposition to the second bellows, and the movable roller being mounted in slidable relation to the framework, mounted approximately parallel to and abutting the fixed roller and mounted in force imparting disposition to the fixed roller, and wherein the force imparted by the first bellows and the second bellows, on the movable roller, are approximately equal; and
   wherein said movable roller is tapered from the middle portion to the first end and from the middle portion to the second end.

4. A roller for use in combination with a crop conditioner comprising:
   a. a roller body with a compressible base mat around the circumference of the roller body, the compressible base mat including a first side and a second side, the first side of the base mat secured to the roller on the crop conditioner;
   b. the second side of the base mat being comprised of:
      i. a base surface; and
      ii. a plurality of platform surfaces on the base surface; and
   wherein the base mat has a first end, a second end and a middle portion, wherein said base mat is tapered from the middle portion to the first end and from the middle portion to the second end.

5. A roller for use in combination with a crop conditioner comprising:
   a. a roller body with a compressible base mat around the circumference of the roller body, the compressible base mat including a first side and a second side, the first side of the base mat secured to the roller on the crop conditioner;
   b. the second side of the base mat being comprised of:
      i. a base surface; and
      ii. a plurality of platform surfaces on the base surface, the platform surfaces including a plurality of gouges in the platform surfaces.

6. A roller for use in combination with a crop conditioner comprising:
   a. a roller body with a compressible base mat around the circumference of the roller body, the compressible base mat including a first side and a second side, the first side of the base mat secured to the roller on the crop conditioner;
   b. the second side of the base mat being comprised of:
      i. a base surface; and
      ii. a plurality of platform surfaces on the base surface; and
      iii. side surfaces between the base surface and the plurality of platform surfaces, the side surfaces being at an angle of less than ninety degrees relative to the platform surfaces.

7. A method for the conditioning of crops, comprising the following steps:
   a. providing a framework;
   b. providing an elongated fixed roller rotatably mounted to the framework, said fixed roller including a first end, a second end and a middle portion, wherein said fixed roller is tapered from the middle portion to the first end and from the middle portion to the second end;
   c. providing a first bellows and a second bellows, each mounted to the framework;
   d. providing a movable roller with a first end mounted in force receiving disposition to the first bellows, and a second end of the movable roller mounted in force receiving disposition to the second bellows, and the movable roller being mounted in slidable relation to the framework, mounted approximately parallel to and abutting the fixed roller and mounted in force imparting disposition to the fixed roller, and wherein the force imparted by the first bellows and the second bellows, on the movable roller, are approximately equal;

e. passing crop material between the fixed roller and the movable roller; and f. applying a crushing force from the bellows to the movable roller to crush the crop material passing between the fixed roller and the movable roller.

8. A method for the conditioning of crops as recited in claim 7, and further wherein said movable roller includes a first end, a second end and a middle portion, wherein said movable roller is tapered from the middle portion to the first end and from the middle portion to the second end.

9. A method for the conditioning of crops, comprising the following steps:

a. providing a framework;

b. providing a fixed roller rotatably mounted to the framework;

c. providing a first bellows and a second bellows, each mounted to the framework;

d. providing a movable roller with a first end mounted in force receiving disposition to the first bellows, and a second end of the movable roller mounted in force receiving disposition to the second bellows, and the movable roller being mounted in slidable relation to the framework, mounted approximately parallel to and abutting the fixed roller and mounted in force imparting disposition to the fixed roller, and wherein the force imparted by the first bellows and the second bellows, on the movable roller, are approximately equal, and wherein said movable roller includes a first end, a second end and a middle portion, wherein said movable roller is tapered from the middle portion to the first end and from the middle portion to the second end;

e. passing crop material between the fixed roller and the movable roller; and f. applying a crushing force from the bellows to the movable roller to crush the crop material passing between the fixed roller and the movable roller.

10. A roller for use in combination with a crop conditioner, comprising:

a. a roller body with a compressible base mat around the circumference of the roller body, the compressible base mat including a first side and a second side, the first side of the base mat secured to the roller on the crop conditioner;

b. the second side of the base mat being comprised of:
  i. a base surface; and
  ii. a plurality of platform surfaces on the base surface.

11. A roller for use in combination with a crop conditioner as recited in claim 10, and wherein the compressible base mat is secured to the roller body by vulcanization.

* * * * *

UNITED STATES PATENT AND TRADEMARK OFFICE
CERTIFICATE OF CORRECTION

PATENT NO. : 6,360,515 B1 Page 1 of 1
DATED : March 26, 2002
INVENTOR(S) : Ivan J. Cook It is certified that error appears in the above-identified patent and that said Letters Patent is hereby corrected as shown below:

<u>Title page,</u>
Item [57], ABSTRACT,
Line 1, add the words -- Disclosed is -- at the beginning of the paragraph.

<u>Column 11,</u>
Line 31, delete the word "puffing" and replace with -- putting --.

Signed and Sealed this

Thirty-first Day of December, 2002

JAMES E. ROGAN
*Director of the United States Patent and Trademark Office*